June 17, 1969     B. B. MATHEWS ETAL     3,450,260
CONVEYOR AND SEGREGATING BELT CONSTRUCTION
Filed Aug. 23, 1967     Sheet 1 of 2

INVENTORS
BENTLEY B. MATHEWS
BY PAUL T. FRENTZEN

ATTORNEYS

INVENTORS
BENTLEY B. MATHEWS
BY PAUL T. FRENTZEN

ATTORNEYS

United States Patent Office 3,450,260
Patented June 17, 1969

3,450,260
CONVEYOR AND SEGREGATING BELT CONSTRUCTION
Bentley B. Mathews, Box 335, Arbuckle, Calif. 95912, and Paul T. Frentzen, Arbuckle, Calif.; said Frentzen assignor to said Mathews
Filed Aug. 23, 1967, Ser. No. 662,662
Int. Cl. B07b *13/04;* B65g *17/40*
U.S. Cl. 209—84    12 Claims

ABSTRACT OF THE DISCLOSURE

A continuous belt construction comprised of rows of end-to-end overlapping plates arranged in transversely aligned spaced parallel rows. The transversely aligned plates define links making up the belt and are pivotally interconnected by transversely extending rectilinear rods extending through their overlapping ends. Various embodiments of the construction employ, either in combination or alternatively: rods extending transversely through the plates intermediate the rods extending through their overlapping ends; cylindrical spacers received around the connecting and/or intermediate rods; extruded openings in the plates to provide bearing areas for the rods extending therethrough of a depth greater than the plate thickness; plate arrangements and structure providing protruding leading edges on the links formed by the transversely aligned plates; and, structure wherein the intermediate rods are disposed laterally of the planes defined by the connecting rods extending through the overlapping ends of the plates.

---

The present invention relates to a continuous link belt construction and, more particularly, is directed to such screening openings of varying size. In its more specific aspects, the invention is concerned with a continuous link belt construction wherein transverse segments of the belt may be prefabricated prior to final belt assembly.

In the prior art, various types of link belts have been provided. Certain of these employ links which interlock in mesh-like fashion, while others employ links fabricated of rows of overlapping plates interconnected by pin-like connections. The present invention pertains to a link belt construction of the latter category.

Link type belts fabricated of pin connected overlapping plates are most common in the chain transmission art where they are used to transmit torque from one sprocket to another. Such belts are also common, however, in the art of segregating screen conveyors to which the present invention primarily pertains. When used in the latter art, the openings defined by the pin connections and plates making up the belts are utilized to separate articles on the basis of size. A machine in which such belts might be employed is disclosed in our co-pending application Ser. No. 481,847, filed Aug. 23, 1965, and entitled, "Segregation Apparatus and Method."

To achieve specific separation characteristics with prior art segregating screen conveyor belts fabricated of overlapping pin connected plates, it has typically been required to fabricate special plates for each set of characteristics desired. As a result, such belts have been both expensive and difficult to obtain. This has been particularly true where the belts were required in small quantities.

In summary, the segregating screen conveyor belt of the present invention comprises a link belt of the overlapping pin connected plate type constructed so that it may be assembled to achieve varying specific screening opening and surface characteristics. These characteristics may be varied while employing a uniform plate, and, thus, the difficulties and expense encountered with prior art constructions requiring special plates for each set of characteristics desired are avoided. Certain embodiments of the invention employ plates to impart in themselves irregular surface characteristics to the belt fabricated therefrom. Other embodiments of the invention employ plates designed to impart either regular or irregular surface characteristics to the belt fabricated therefrom, depending upon the assembly technique employed for belt construction.

It is, accordingly, a principal object of the present invention to provide a segregating screen conveyor belt construction adapted to provide varying specific screening opening and surface characteristics.

Another and more specific object of the invention is to provide a construction capable of providing such characteristics without the necessity of employing specially constructed elements for each specific characteristic desired.

Still another object of the invention is to provide such a construction capable of being readily assembled to provide specific screening opening and/or surface characteristics.

These and other objects and the specifics of the invention will become more apparent when view in light of the following detailed description and accompanying drawings wherein:

FIGS. 1 to 6, inclusive, are partially exploded perspective views illustrating embodiments of the inventive construction wherein the same three apertured overlapping plate is employed in the fabrication of belts having different specific screening opening characteristics;

Figure 11:
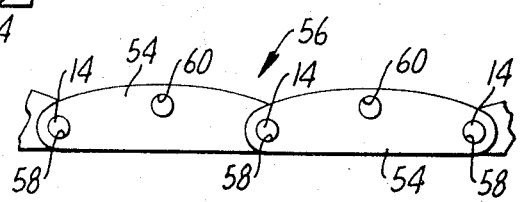
Figure 12:
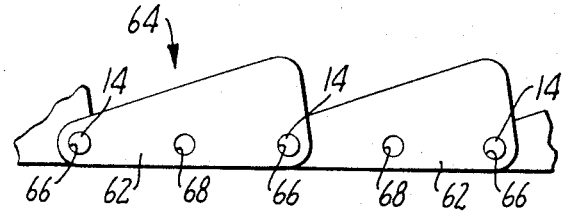

FIG. 11 is a partial elevational view illustrating an embodiment of the inventive construction employing three apertured overlapping plates wherein the center aperture in each plate is disposed laterally of the plane defined by the end apertures therein; and, FIG. 12 is a partial elevational view illustrating an embodiment of the inventive construction wherein the overlapping plates are provided with leading edges of a depth greater than their trailing edges.

Figure 1:
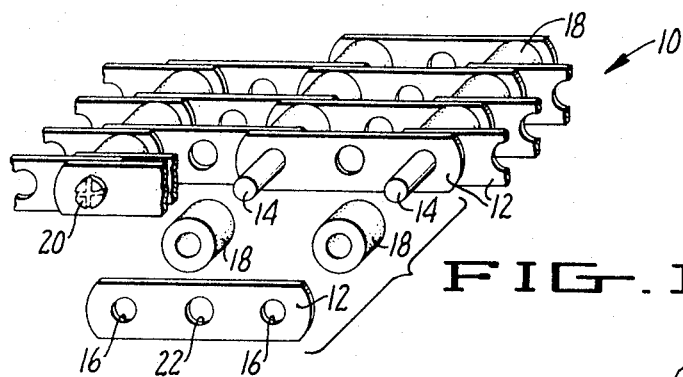

Referring now specifically to FIG. 1, the embodiment of the belt construction there illustrated is designated in its entirety by the numeral 10. This construction is made up of a plurality of identical elongate plates 12 arranged in longitudinally extending rows with the ends of the successive plates in each of the rows overlapping in face to face relationship. The plates in the respective rows are transversely aligned and interconnected by rods 14 extending transversely through their overlapping ends. Transversely extending apertures 16 formed in the respective ends of each of the plates 12 provide for passage of the rods 14 therethrough. The apertures 16 in the overlapping ends of the plates are axially aligned and of sufficient diameter to permit the rods 14 to turn therein. Through the latter provision, flexibility is imparted to the belt construction 10.

The longitudinally extending rows of the plates 12 in the construction 10 are maintained in spaced relationship by sleeves 18 received over the portions of the connecting rods 14 disposed between the rows. The sleeves 18 abut against the plates in the rows to either side thereof to maintain the spaced relationship. To provide flexibility of the belt construction, the plates may pivot relative to the sleeves in abutting engagement therewith. Riveted ends, as designated by the numeral 20, maintain the plates, rods and sleeves of the construction 10 in assembled condition. These ends abut against the outermost plates 12 in the construction. If desired, they may be employed to impart transverse compression to the sleeves 18 and, thus, control the flexibility of the belt construction.

The FIG. 1 belt construction is of relatively conventional nature, with the exception that each of the plates 12 has a transversely extending aperture 22 formed therethrough intermediate the end apertures 16. In the embodiment of FIG. 1, however, these intermediate apertures perform no active function. They are there illustrated simply to show that the plates 12 may be employed to fabricate the relatively conventional FIG. 1 belt construction, as well as the more unique constructions illustrated in the other figures.

Figure 2:
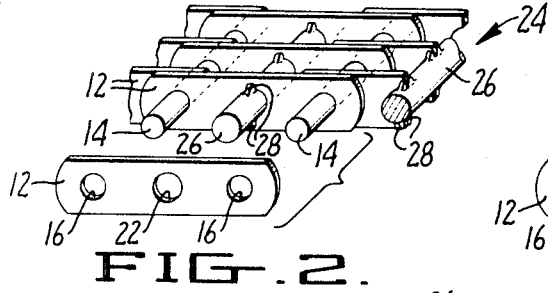

Referring now to FIG. 2, the embodiment of the belt construction therein illustrated is designated in its entirety by the numeral 24. This belt construction is similar to that of FIG. 1 in that it is comprised of a plurality of longitudinally extending transversely aligned rows of plates 12 arranged with the ends of the successive plates in each of the rows in overlapping face to face relationship. The FIG. 2 embodiment is also similar to that of FIG. 1 in that rods 14 extend transversely across the belt construction and through the apertures provided in the overlapping ends of the plates. It distinguishes from the FIG. 1 embodiment, however, in that spacing of the longitudinally extending rows of plates is effected by intermediate rods 26, rather than sleeves 18. The rods 26 extend through the intermediate apertures 22 in the transversely aligned plates and have crimped portions 28 disposed to either side of each of the plates traversed thereby. These portions abut against the plates and prevent their movement toward and away from each other. It is through this abutting interrelationship that the rows of overlapping plates in the FIG. 2 embodiment are maintained in spaced parallel relationship.

In addition to maintaining the rows of plates in the FIG. 2 embodiment in spaced parallel relationship, the intermediate rods 26 also function to divide the screening openings provided between the rods 14. This dividing characteristic can be seen from a comparison of FIGS. 1 and 2. In the FIG. 1 embodiment, one screening opening is formed between each pair of transversely adjacent plates and the rods 14 extending therethrough. This opening is defined by the inner surfaces of the plates and the sleeves 18 disposed therebetween. In the FIG. 2 embodiment, two screening openings are provided between each pair of transversely adjacent plates and the rods 14 extending therethrough. These openings are defined by the inner surfaces of the plates and the rods 14 and 26 extending therethrough.

The embodiment shown in FIG. 2 also has the advantage, as compared to the embodiment of FIG. 1, that it facilitates prefabrication of belt segments prior to their assembly into an integrated belt construction. Specifically, segments comprised of a plurality of the plates 12 crimped to the rod 26 may be prefabricated prior to their assembly into an integrated belt construction. It is noted that a belt assembled according to the FIG. 2 embodiment would have the outermost ends of the connecting rods 14 therein riveted over similarly to the riveted ends 20 shown in FIG. 1.

Figure 3:
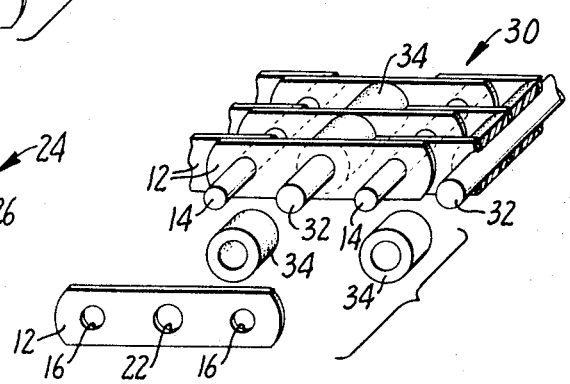

Referring now to FIG. 3, the embodiment of the belt construction therein illustrated is designated in its entirety by the numeral 30. This construction is similar to those illustrated in FIGS. 1 and 2 in that it is comprised of a plurality of the plates 12 arranged in a plurality of longitudinally extending transversely aligned rows with the ends of the successive plates in each of the rows overlapping in face to face relationship. The FIG. 3 embodiment distinguishes from that of FIG. 2 only in that it is provided with a different form of intermediate rod extending through the transversely aligned intermediate apertures 22 in the plates 12. Specifically, the intermediate rods in the FIG. 3 embodiment, designated by the numeral 32, are smooth and have sleeves 34 received therearound between the plates traversed thereby. The sleeves 34 perform a function similar to the crimped portions 28 in that they function to maintain the rows of plates in spaced parallel relationship. The sleeves further function to decrease the area of the screening openings defined to either side of the intermediate rod 32 about which they are received.

It is noted that the FIG. 3 embodiment is also similar to that of FIG. 2 in that it facilitates prefabrication of belt segments prior to final assembly of the belt into a composite construction. In the FIG. 3 embodiment, it is preferable to provide riveted ends, similar to the end 20 shown in FIG. 1, on the outermost ends of both the rods 14 and 32.

Figure 4:
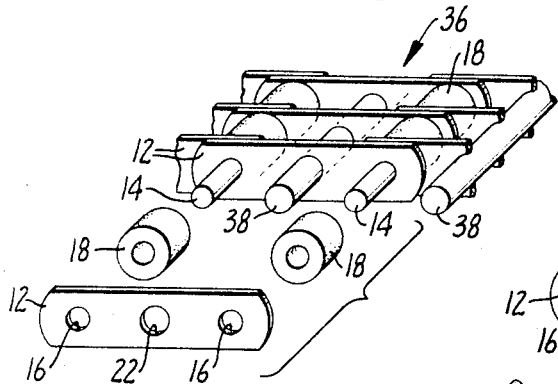

Referring now to FIG. 4, the construction of the embodiment therein illustrated is designated in its entirety by the numeral 36. This construction is identical to that of FIG. 1, with the exception that intermediate rods 38 are extended through the transversely aligned intermediate apertures 22. The rods 38 correspond in construction to the rods 32 of the FIG. 3 embodiment. They differ in function, however, in that no sleeves are received therearound. The rods 38 function, primarily, to divide the screening opening defined between each pair of transversely adjacent plates 12 and the connecting rods 14 extending therethrough. They also function, to some degree, to rigidify the belt construction. Preferably, the outermost ends of the rods 38 are riveted similarly to the riveted ends 20 illustrated in FIG. 1.

Figure 5:
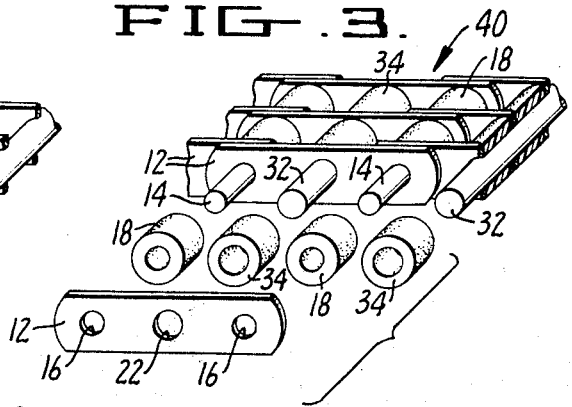

The embodiment of the construction illustrated in FIG. 5 is designated in its entirety by the numeral 40. This construction is in effect, a combination of the FIG. 1 and 3 embodiments. It comprises an arrangement corresponding to FIG. 3, with the exception that the connecting rods 14 have sleeves 18 received therearound in a manner corresponding to the FIG. 1 embodiment. Thus, in the FIG. 5 embodiment, the rows of overlapping plates are maintained in spaced parallel relationship by both the sleeves 18 received around the connecting rods 14 and sleeves 34 received around the intermediate rod 32. Preferably, in the FIG. 5 embodiment the outermost ends of the rods 14 and 32 are riveted over, corresponding to the riveted ends 20 illustrated in FIG. 1.

The FIG. 5 embodiment is similar to the FIG. 3 embodiment in that transversely extending links can be prefabricated around the rods 32 prior to assembly into a composite belt construction. It distinguishes from the FIG. 3 embodiment, primarily, in that the screening openings between each pair of transversely adjacent plates 12 are defined by the inner surfaces of the plates and the sleeves 18 and 34 received therebetween. This is contrasted to the FIG. 3 embodiment wherein the screening openings are defined, in part, directly by the surfaces of the connecting rods 14.

Figure 6:
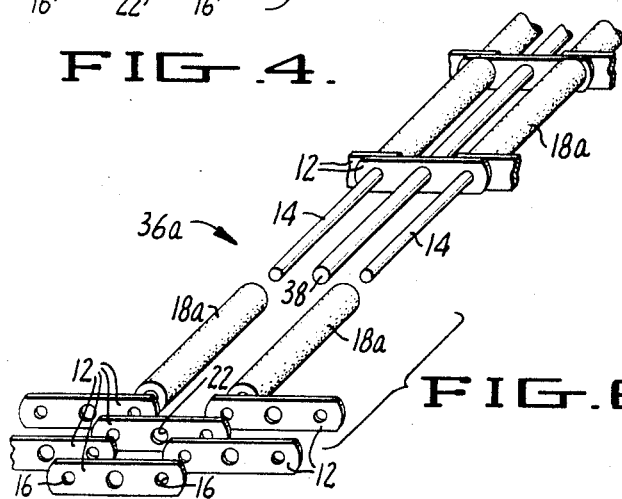

Referring now to FIG. 6, the belt construction of the embodiment therein illustrated is designated by the numeral 36a. This construction corresponds substantially to the construction 36 of FIG. 4, with the exception that it employs longer sleeves. The sleeves, designated by the numerals 18a, simply function to elongate the areas of the screening openings in the construction.

In FIG. 6, increased laminae of plates at the edge of the construction are also illustrated. These are merely intended for reinforcing purposes. It is noted that the outermost ends of the rods 14 and 38 in the FIG. 6 embodiment are riveted over at the outermost laminae similar to the riveted end 20 illustrated in FIG. 1.

Figure 7:
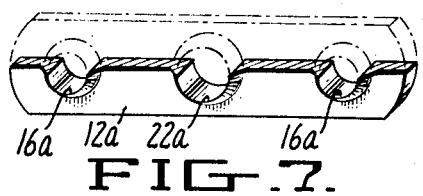
FIG. 7 is a perspective view, partially in section, of a plate suitable for employment in the inventive construction having extruded apertures which provide a bearing area of a depth greater than the thickness of the plate.

FIG. 7 illustrates a modified form of plate, designated by the numeral 12a, which may be incorporated into any of the embodiments of the present invention. Plate 12a differs from the aforedescribed plate 12 only in that the apertures formed therethrough are extruded so as to bulge to one side of the plate and have an interior surface area of a depth greater than the plate thickness. These apertures are designated by the numerals 16a and 22a and, as seen in FIG. 7, bulge toward the viewer.

The extruded apertures of the plate 12a produce several advantages, as compared to sharply cut apertures. The prime advantage resulting from these apertures resides in the fact that the bearing area presented thereby is increased, and, thus, the load and wear capabilities of the apertures are enhanced. Another important advantage of the extruded apertures resides in the fact that their increased bearing area functions to rigidify belts constructed therefrom. Still another advantage of these apertures results because the bulged portions thereof function to prevent the rotation of spacing sleeves juxtaposed thereto.

Figure 8:
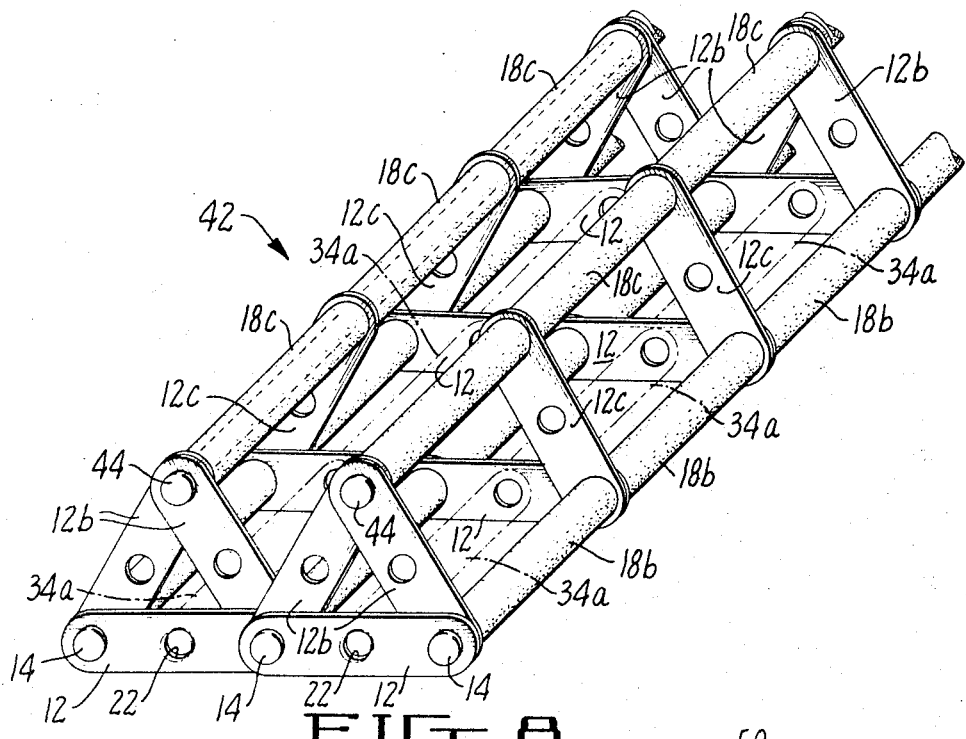
FIG. 8 is a perspective view illustrating an embodiment of the inventive construction wherein three apertured overlapping plates are assembled to provide a belt having upstanding transversely extending portions extending over its upper surface.

Referring now to FIG. 8, the embodiment of the construction therein illustrated is designated by the numeral 42. This construction comprises a plurality of first or primary rows of plates arranged in longitudinally extending transversely aligned rows with the successive plates in each of the rows overlapping in face to face relationship. To this extent, and in the construction of the plates making up these rows, the FIG. 8 embodiment is similar to the aforedescribed embodiments of FIGS. 1 to 6. In the manner in which these first rows are connected and maintained in spaced relationship, the FIG. 8 embodiment corresponds most closely to that of FIG. 1. This results because the overlapping plates in the first or primary rows are connected only by rods 14 extending through the openings in their overlapping ends and because the spaced interrelationship between the rows is maintained by sleeves 18b received around these rods intermediate the plates.

In the FIG. 8 embodiment, the foremost and rearmost of the first or primary rows have transversely aligned intersecting pairs of plates, designated by the numerals 12b, disposed to one side thereof and co-planar therewith. The plates in each of these pairs correspond in construction to the plates 12 and have first intersecting end portions disposed remote from the plates in the primary rows coplanar therewith and second distal end portions having the apertures therein received over the rods 14 connecting the primary rows. The distal end portions of the plates 12b are held against the plates 12 therebeneath by the sleeves 18b. The angularly intersecting end portions of each pair of the plates 12b are connected to each other and to the pair of plates transversely aligned therewith by a transversely extending rod 44. Between the foremost and rearmost pairs of plates illustrated in FIG. 8, intermediate plates, designated by the numeral 12c, extend between the leading and trailing rods 14 and the rods 44. The plates 12c correspond in construction to the plates 12 and have the apertures in the end portions thereof threaded over the rods 14 and 44 between which they extend. The sleeves 18b function to maintain the plates 12c against the plates 12 in the first or primary rows between the foremost and rearmost of said rows. Sleeves 18c, corresponding identically to the sleeves 18b, are received around the rods 44 to maintain the upper ends of the plates 12c in spaced relationship relative to each other and the plates 12b.

The structure 42 is held in assembled condition by riveting over the distal ends of the rods 14 and 44 incorporated thereinto. The riveted ends on the rods correspond substantially to the aforedescribed riveted ends 20 and, if desired, may be formed to impart compression to the sleeves 18b and 18c.

In the solid line representation of FIG. 8, the screening openings are defined by each transversely aligned pair of the plates 12 and the sleeves 18b extending therebetween. To this extent, the solid line representation of FIG. 8 corresponds to the embodiment of FIG. 1. If desired, the central openings in the plates 12 forming the primary rows of the FIG. 8 embodiment may also be employed to control the area of the screening openings similarly to the embodiments of FIGS. 2 to 6. The phantom line representations, designated by the numerals 34a, illustrate how sleeves might be employed in the FIG. 8 embodiment to control the screening opening size in a manner similar to the FIG. 5 embodiment.

In application, the FIG. 8 embodiment functions in relatively conventional manner in that segregation on the basis of size is effected through the screening openings defined by each pair of the transversely aligned plates 12 and the sleeves 18b disposed therebetween. The operation distinguishes from that of conventional segregating belts, however, in that the upstanding portions provided by the plates 12b and 12c, the rods 44 and the sleeves 18c function to catch and retain elongate stick-like articles. Articles retained in these portions are conveyed by the belt to the downstream end of the upper reach thereof and, at that point, discharge. Discharging or ejection of such articles is facilitated because the adjacent upstanding portions spread as the belt moves over the support roller provided at the downstream end of its upper reach. Such a support roller may be seen in my aforementioned co-pending application Ser. No. 481,847.

Although not illustrated, it is to be understood that pairs of intersecting plates, corresponding to the plates 12b, may be substituted in place of the plates 12c. Such a substitution would function to impart greater support to the rods 44 and modify the stick catching and retaining characteristics of the FIG. 8 embodiment. It would also tend to avoid wedging of sticks at the intersection of the plates 12 and 12c. Basic operation of the structure, however, would be the same.

Figure 9:
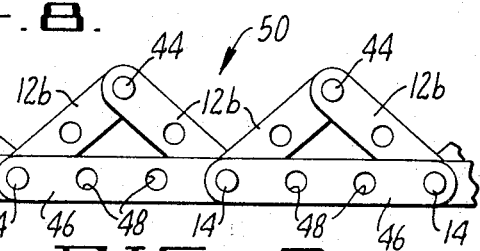
FIGS. 9 and 10 are partial elevational views illustrating embodiments of the inventive construction wherein three or four aperture overlapping plates are assembled to provide belts having upstanding portions extending transversely across their upper surfaces.

FIG. 9 illustrates an embodiment distinguishing from that of FIG. 8 only in that elongated plates, designated by the numerals 46, have been substituted for the plates 12 making up the primary rows. In addition to differing from the plates 12 in length, the plates 46 also distinguish in that they are provided with pairs of equally spaced intermediate apertures 48, rather than a single centrally disposed aperture 22. The apertures 48, however, are employed similarly to the apertures 22.

The employment of the elongated plates 46 in the FIG. 9 construction, designated in its entirety by the numeral 50, results in a belt of flattened profile. In basic operation, however, this construction corresponds to that of the FIG. 8 embodiment.

Figure 10:
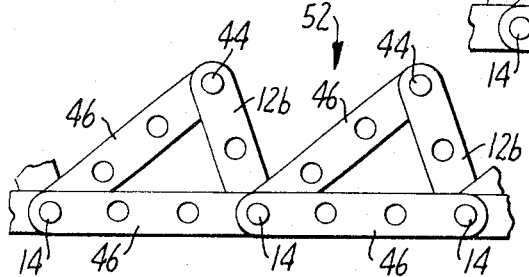

Referring now to FIG. 10, therein is illustrated another embodiment of the inventive construction, designated by the numeral 52, differing from that of FIG. 8 only in the relative proportions of the plates employed therein. Specifically, in this embodiment elongated plates 46, corresponding to those of FIG. 9, are employed both to make up the primary rows and the rearmost sides of each pair of the intersecting plates. The foremost sides of each pair of the intersecting plates is made up by plate 12b corresponding to that of the FIG. 8 embodiment. The resulting construction distinguishes from that of FIG. 8 both in the length of its components links and the angular interrelationship of the upstanding portions formed on each of these links. It is noted that the leading edge of each of the upstanding portions is more upright than that of the FIG. 8 embodiment, while the trailing edge is more inclined.

The basic operation of the FIG. 10 embodiment corresponds to the aforedescribed operation of the FIG. 8 embodiment. Because of the different angular interrelationships of the upstanding portions in these embodiments, however, each will differ in its specific operating characteristics on a particular type of elongate stick-like article being removed thereby.

FIG. 11 illustrates a modified plate which may be incorporated into any of the aforedescribed embodiments in place of the plates 12, 12a, 12b or 12c. This plate, designated by the numeral 54, is illustrated incorporated into a belt construction 56. The plate 54 is provded with end apertures similar to the apertures 16 of the plate 12 and an intermediate aperture 60 disposed centrally between the apertures 58. The latter aperture differs from the aperture 22 of the plate 12 in that it is spaced laterally from the plane defined by the axes of the end apertures 58. The plate 54 also distinguishes from the plate 12 in that its upper edge is of convex configuration.

As a result of the positioning of the aperture 60 relative to the apertures 58, a rod extended through the aperture 60 is spaced above connecting rods extended through the apertures 58. This results in a construction wherein rods extended through the apertures 60 and any sleeve supported on these rods protrude above the upper extremity of connecting rods extended through the apertures 58 and any sleeve received thereon. It also results in a construction wherein the area of the screening openings defined between transversely aligned plates and connecting and intermediate rods extending therebetween is controlled by both the horizontal and vertical spacing of the rods.

FIG. 12 illustrates yet another plate, designated by the numeral 62, which may be employed in any of the aforedescribed embodiments in place of the plates 12, 12a, 12b, or 12c. As illustrated, this plate is shown incorporated into a belt construction 64. The plate 62 differs from the plate 12 only in that its leading edge portion has a depth, as measured from the plane defined by the apertures extending therethrough, greater than its trailing edge portion. The end and intermediate apertures of the plate 62 are designated by the numerals 66 and 68, respectively.

The plate 62 may be employed to impart stick removal characteristics to belts constructed according to the present invention and vary the angular interrelationships of the various surfaces formed on these belts. For example, when employed in horizontally disposed relationship as illustrated in FIG. 12, the leading and trailing overlapping end portions of adjacent plates provide angularly intersecting surfaces which function to catch and retain stick-like articles. These surfaces are similar to the surfaces of the plates 12b of the FIG. 8 embodiment both in their retaining and rejecting operations.

While several specific embodiments have been illustrated and described, it is to understood that the characteristics of the various embodiments might be combined to arrive at still further embodiments. For example, it is anticipated that the extruded aperture construction illustrated in FIG. 7 might be incorporated into the plates employed in any of the embodiments.

What is claimed is:

1. An endless conveyor belt and segregating screen, comprising:
 (a) a plurality of substantially identical primary elongate plates arranged in a plurality of longitudinally extending transversely aligned rows with the ends of the successive plates in each of said rows overlapping in face to face relationship, said plates each having:
  (1) a transversely extending aperture formed in each end thereof in axial alignment with the corresponding aperture formed in the end of the plate in overlapping face to face relationship therewith; and,
  (2) at least one intermediate aperture disposed between the apertures formed in the ends thereof;
 (b) a plurality of rectilinear connecting rods extending, respectively, across said rows and through the aligned apertures in the overlapping ends of the plates in each of said rows;
 (c) a plurality of rectilinear spacing rods extending, respectively, across said rows and through the intermediate apertures in said plates; and
 (d) mutually interengageable means on said spacing rods and plates to maintain said rows in spaced parallel relationship.

2. An endless conveyor belt and segregating screen according to claim 1, wherein said means comprise:
 (a) bushings received around each of said spacing rods intermediate the plates traversed thereby, said bushings having end surfaces spaced apart by a distance substantially equal to the spacing to be maintained between said rows; and
 (b) surfaces on said plates disposed in abutting engagement with the end surfaces of the bushings to either side thereof.

3. An endless conveyor and segregating screen according to claim 1, wherein said means comprise:
 (a) clenched portions formed on said spacing rods to either side of each of the plates traversed thereby; and
 (b) surfaces on said plates disposed in abutting engagement with the clenched portions to either side thereof.

4. An endless conveyor belt and segregating screen according to claim 1, wherein said plates further have an extruded bearing defining collar formed therein around each of the apertures formed in the ends thereof of a depth greater than the thickness thereof.

5. An endless conveyor belt and segregating screen according to claim 1, further comprising a plurality of secondary elongate plates arranged in transversely aligned pairs, said pairs being disposed, respectively, to one side of and co-planar with the rows in which said primary plates are arranged, the plates in each of said pairs having:
 (1) interconnected angularly intersecting end portions; and
 (2) distal end portions secured, respectively, to at least certain of the connecting rods extending across the rows of said primary plates.

6. An endless conveyor belt and segregating screen according to claim 1, wherein said plates further have a leading edge of a depth, as measured from a centerline extending through the axes of the apertures formed in the ends thereof, greater than the depth of the trailing edge thereof, as measured from said centerline.

7. An endless conveyor belt and segregating screen, comprising:
 (a) a plurality of substantially identical elongate plates arranged in a plurality of longitudinally extending transversely aligned rows with the ends of the successive plates in each of said rows overlapping in face to face relationship, said plates each having:
  (1) a transversely extending aperture formed in each end thereof in axial alignment with the corresponding aperture formed in the plate in overlapping face to face relationship therewith; and
  (2) an extruded bearing defining collar formed therein around each of said apertures of a depth greater than the thickness thereof;
 (b) a plurality of rectilinear connecting rods extending, respectively, across said rows and through the aligned apertures in the overlapping ends of the plates in each of said rows; and
 (c) means maintaining said rows in spaced parallel relationship.

8. An endless conveyor belt and segregating screen according to claim 7, wherein said plates each have at least one intermediate aperture disposed between the apertures formed in the ends thereof and further comprising a plurality of rectilinear spacing rods extending, respectively, across said rows and through said intermediate apertures.

9. An endless conveyor belt and segregating screen, comprising:
(a) a plurality of first elongate plates arranged in a plurality of longitudinally extending transversely aligned rows with the ends of the successive plates in each of said rows overlapping in face to face relationship, said plates each having a transversely extending aperture formed in each end thereof in axial alignment with the corresponding aperture formed in the end of the plate in overlapping face to face relationship therewith;
(b) a plurality of longitudinally spaced rectilinear connecting rods extending, respectively, across said rows and through the aligned apertures in the overlapping ends of the plates in each of said rows;
(c) means to maintain said rows in spaced parallel relationship; and
(d) a plurality of second elongate plates arranged in transversely aligned pairs, said pairs being disposed, respectively, to one side of and co-planar with the rows in which said first plates are arranged, the plates in each of said pairs having:
(1) interconnected angularly intersecting end portions; and
(2) distal end portions secured, respectively, to at least certain of the longitudinally spaced connecting rods extending across the rows of said first plates.

10. An endless conveyor belt and segregating screen according to claim 9, wherein:
(a) the intersecting end portions of each pair of said second elongate plates are provided with transversely extending axially aligned apertures therethrough;
(b) the intersecting end portions of each pair of said second elongate plates are interconnected and connected to the intersecting end portions of the pairs of said second elongate plates in transverse alignment therewith by a rectilinear rod extending continuously through the apertures provided therein and the apertures provided in the intersecting end portions of said second elongate plates in transverse alignment therewith;
(c) the distal end portions of each pair of said second elongate plates are provided, respectively, with transversely extending apertures therethrough; and
(d) the distal end portions of each pair of said second elongate plates are secured, respectively, to certain of the longitudinally spaced connected rods by receipt of the apertures provided therein around said rods.

11. An endless conveyor belt and segregating screen, comprising:
(a) a plurality of substantially identical elongate plates arranged in a plurality of longitudinally extending transversely aligned rows with the ends of the successive plates in each of said rows overlapping in face to face relationship, said plates each having:
(1) a transversely extending aperture formed in each end thereof in axial alignment with the corresponding aperture formed in the end of the plate in overlapping face to face relationship therewith; and
(2) at least one intermediate aperture disposed between the apertures formed in the ends thereof, the axis of said aperture being laterally spaced from a centerline extending between the axes of the apertures formed in the ends thereof;
(b) a plurality of rectilinear connecting rods extending, respectively, across said rows and through the aligned apertures in the overlapping ends of the plates in each of said rows;
(c) a plurality of rectilinear spacing rods extending, respectively, across said rows and through the intermediate apertures in said plates; and
(d) means to maintain said rows in spaced parallel relationship.

12. An endless conveyor belt and segregating screen, comprising:
(a) a plurality of substantially identical elongate plates arranged in a plurality of longitudinally extending transversely aligned rows with the ends of the successive plates in each of said rows overlapping in face to face relationship, said plates each having:
(1) a transversely extending aperture formed in each end thereof in axial alignment with the corresponding aperture formed in the end of the plate in overlapping face to face relationship therewith;
(2) a leading edge of a depth, as measured from a centerline extending through the axes of the apertures formed in the ends thereof, greater than the depth of the trailing edge thereof, as measured from said centerline;
(b) a plurality of rectilinear connecting rods extending, respectively, across said rows and through the aligned apertures in the overlapping ends of the plates in each of said rows; and
(c) means to maintain said rows in spaced parallel relationship.

References Cited

UNITED STATES PATENTS

| | | | |
|---|---|---|---|
| 1,737,150 | 11/1929 | Davis | 198—189 X |
| 3,174,616 | 3/1965 | Sloan | 198—189 |
| 3,348,680 | 10/1967 | Mathews | 209—84 |

ALLEN N. KNOWLES, *Primary Examiner.*

R. A. SCHACHER, *Assistant Examiner.*

U.S. Cl. X.R.

198—189